United States Patent
Baumann

[19]

[11] Patent Number: 6,024,125
[45] Date of Patent: Feb. 15, 2000

[54] ROTARY VALVE

[75] Inventor: Hans D. Baumann, Rye, N.H.

[73] Assignee: Fisher Controls International, Inc., Clayton, Mo.

[21] Appl. No.: 09/189,017

[22] Filed: Nov. 9, 1998

Related U.S. Application Data

[62] Division of application No. 08/663,552, Jun. 13, 1996, abandoned.

[51] Int. Cl.[7] ...................................................... F16K 3/22
[52] U.S. Cl. ...................... 137/625.32; 251/298; 251/360
[58] Field of Search .................................. 251/304, 309, 251/314, 316, 359, 360, 118, 127, 298; 137/625.3, 625.32

[56] References Cited

U.S. PATENT DOCUMENTS

| | | |
|---|---|---|
| 3,623,696 | 11/1971 | Baumann . |
| 3,880,191 | 4/1975 | Baumann . |
| 4,073,473 | 2/1978 | Rihm et al. ............................ 251/298 |
| 4,085,774 | 4/1978 | Baumann . |
| 4,118,008 | 10/1978 | Myers . |
| 4,212,321 | 7/1980 | Hulsey . |
| 4,215,846 | 8/1980 | Ishizuka et al. .................... 251/316 X |
| 4,540,025 | 9/1985 | Ledeen et al. . |
| 4,667,928 | 5/1987 | Davatz et al. ...................... 251/316 X |
| 4,973,406 | 11/1990 | Ponzielli . |
| 5,305,987 | 4/1994 | Baumann . |

FOREIGN PATENT DOCUMENTS 1 975 557  12/1967  Germany .

OTHER PUBLICATIONS

Baumann, H., "Coefficients and Factors Relating to Aerodynamic Sound Level Generated by Throttling Valves", Noise Control Engineering Journal, Jan.–Feb. 1984, pp. 6–11.

*Primary Examiner*—Kevin Lee
*Attorney, Agent, or Firm*—Wolf, Greenfield & Sacks, P.C.

[57] ABSTRACT

A rotary valve provides a casing have an inlet and an outlet and a shaft mounted plug that selectively covers the inlet. A seat ring having an inner seating shoulder that is eccentric relative to the body bore of the inlet is provided. The seat ring can be rotated to accommodate variations in the center of the plug for more accurate seating. The plug can be provided with a secondary plug that selectively covers the outlet and that moves relative to the outlet in response to movement of the shaft. The outlet can include a low noise structure having, in one embodiment, a set of tapered slots that vary the flow cross section along the flow path.

9 Claims, 7 Drawing Sheets

ROTARY VALVE

This is a division of application Ser. No. 08/663,552, filed Jun. 13, 1996, now abandoned.

FIELD OF INVENTION

This invention relates to rotary valves and more particularly improvements to the sealing and flow characteristics of such valves.

BACKGROUND OF INVENTION

Rotary valves typically utilize a rotating plug or gate that often includes a hemispherical seating surface sized and arranged to bear against a seat ring positioned at the inlet of the valve's housing. Many plugs are located at an offset relative to the shaft so that the plug withdraws from the seat ring along a path rearwardly out of contact with the seat ring as it rotates from a closed position to an open position. It is important that the seat ring be accurately aligned relative to hemispherical plug to ensure a leak-free closure.

Side-to-side (lateral) alignment of the plug along the shaft can be accommodated simply by moving the plug or shaft axially to align the plug seating surface laterally relative to the seat ring. However, radial movement, transverse to the axial direction of the shaft, cannot easily be accomplished because the valve's housing/casing includes fixed bearing surfaces for the shaft that prevent any radial movement and the plug is radially fixed relative to the shaft. Accordingly, any inherent variations in the location of the plug's seating surface relative to the axis of rotation of the shaft can result in a gap between the seat ring and plug seating surface, causing leaks and binding of components during movement.

A technique for correcting misalignments between the seating surface of the plug and the seat ring is shown and described in U.S. Pat. No. 5,305,987 to Baumann. This patent teaches a plug mounted on a hub that it is adjustable so that the plug can be moved toward and away from the seat ring. In addition, the plug includes a ball and socket joint that allows a user to change the plug's angle of contact relative to the seat ring. These adjustments ensure the maintenance of a tight seal when the plug is placed in a shut-off position.

Additionally, the flow characteristics of fluid though a rotary valve are often of importance. When the plug is partially open, fluid entering the valve is under high pressure and forms a jet. This jet can generate noise, often in the form of a whistle. In most valves, the outlet is completely uncovered and, therefore, a substantial pressure drop occurs. In addition, flow patterns are disrupted by the presentation of a wide-open outlet resulting in further noise and, in many applications, cavitation. A more-balanced, low-noise flow through the valve housing is desirable.

It is, therefore, an object of one embodiment of this invention to provide a rotary valve having a simple and effective mechanism for providing an accurate fit between the plug's hemispherical seating surface and the seat ring. This adjustment mechanism should adjust easily over a relatively large range of distances. According to another embodiment of this invention, the rotary valve should provide a smooth flow characteristic through the housing and should have noise-reducing structures at the inlet and outlet.

SUMMARY OF THE INVENTION

A rotary valve according to this invention overcomes disadvantages of the prior art by providing an easily adjustable seat ring with an eccentric seating shoulder that can be rotated to a variety of positions to accommodate differences in the positioning of a valve plug seating surface. The seat ring can be provided with a secondary shoulder that reduces noise by breaking up the flow of a fluid jet when the valve plug is partially open. Further noise control is provided by employing a secondary plug that covers a portion of the outlet of the valve when the valve is only partially open. The outlet of the valve can be fitted with a low noise structure that facilitates the collapse of potentially cavitating vapor bubbles by providing a variable cross section along the flow path.

According to one embodiment, the valve includes a casing with an inlet and an outlet. A plug, that can include a hemispherical seating surface, is movably located relative to the inlet and a seat ring is positioned within the inlet adjacent the movable plug. The seat ring includes an outer rim that engages the casing and an inner seating shoulder that engages the plug. The inner seating shoulder has a center that is offset from a center of the outer rim. The seat ring is rotatable relative to the body bore of the inlet to accommodate positional variations in the center of the hemispherical seating surface of the plug. Lateral variations in the center of the seating surface that accompany rotation of an eccentric seat ring are accommodated by lateral movement of the plug relative to the plug shaft or by the plug end of shaft as a whole.

According to another embodiment, the seat ring can include secondary shoulder having a larger diameter than the seating shoulder located between the seating shoulder and the plug. This secondary shoulder breaks up the flow of fluid jets as a pass between the seating shoulder and the partially open plug.

According to another embodiment, a rotary valve can include a casing with an inlet and an outlet and a plug rotatably mounted relative to the inlet on a plug shaft that rotates relative to the casing. A secondary plug is also provided adjacent the outlet This secondary plug moves in conjunction with the plug as the shaft is rotated so that it selectively covers a portion of the outlet. In this manner, the size of the inlet and outlet can be roughly equalized to provide a more even fluid flow with the decrease pressure differential between the inlet and outlet. The secondary plug can be maintained at a gap from the outlet so that it does not seal the outlet. The secondary plug can be formed as a curved surface or a hemisphere and the outlet can be correspondingly curved or hemispherical.

According to another embodiment, or used in conjunction with a secondary plug, the outlet can include a low-noise structure formed with a set of openings that decrease the flow cross section along the flow path through the outlet. In other words, the amount of surface area presented at any given point along the linear distance of the outlet, through which fluid can pass, varies. In one embodiment, the openings can comprise a set of slots having tapered sidewalls. The sidewalls can be tapered inwardly so that the flow cross section decreases as fluid moves through the inlet. These slots, thus, serve to decrease pressure and collapse vapor bubbles that could, otherwise, lead to cavitation at a downstream position. Two sets of parallel slots can be utilized. Each of the sets of slots can be oriented perpendicularly to the other and can be spaced apart along the flow path. One of the sets of slots, typically more downstream, can be provided as a removable insert while another of the sets of slots, typically more adjacent the plug can be provided within a wall section that is curved or hemispherical to conform to the shape of a curved or hemispherical secondary plug. In another configuration, the low-noise structure may include a single insert having multiple tapered openings arranged in a flow path so that the flow cross section in each of the openings varies along the flow path. Any of the components described herein can be used in conjunction with any of the other components described herein. Likewise, each of the components described herein can be used separately in a given valve.

BRIEF DESCRIPTION OF THE DRAWINGS

The foregoing and other objects and advantages of the invention will become more clear with reference to the following detailed description as illustrated by the drawings in which.

DETAILED DESCRIPTION

Figure 1:
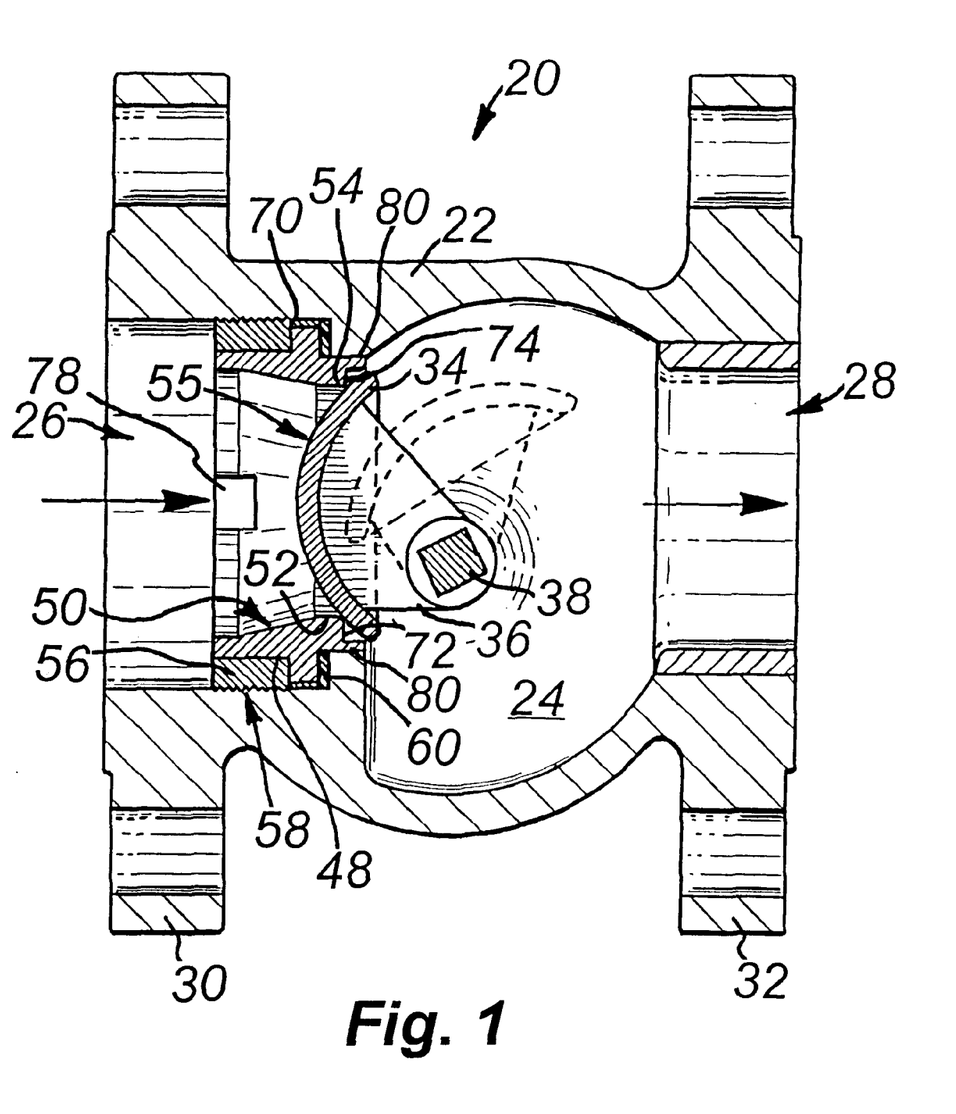
FIG. 1 is a side cross section of a rotary valve with an eccentric seat ring according to one embodiment of this invention.
Figure 2:
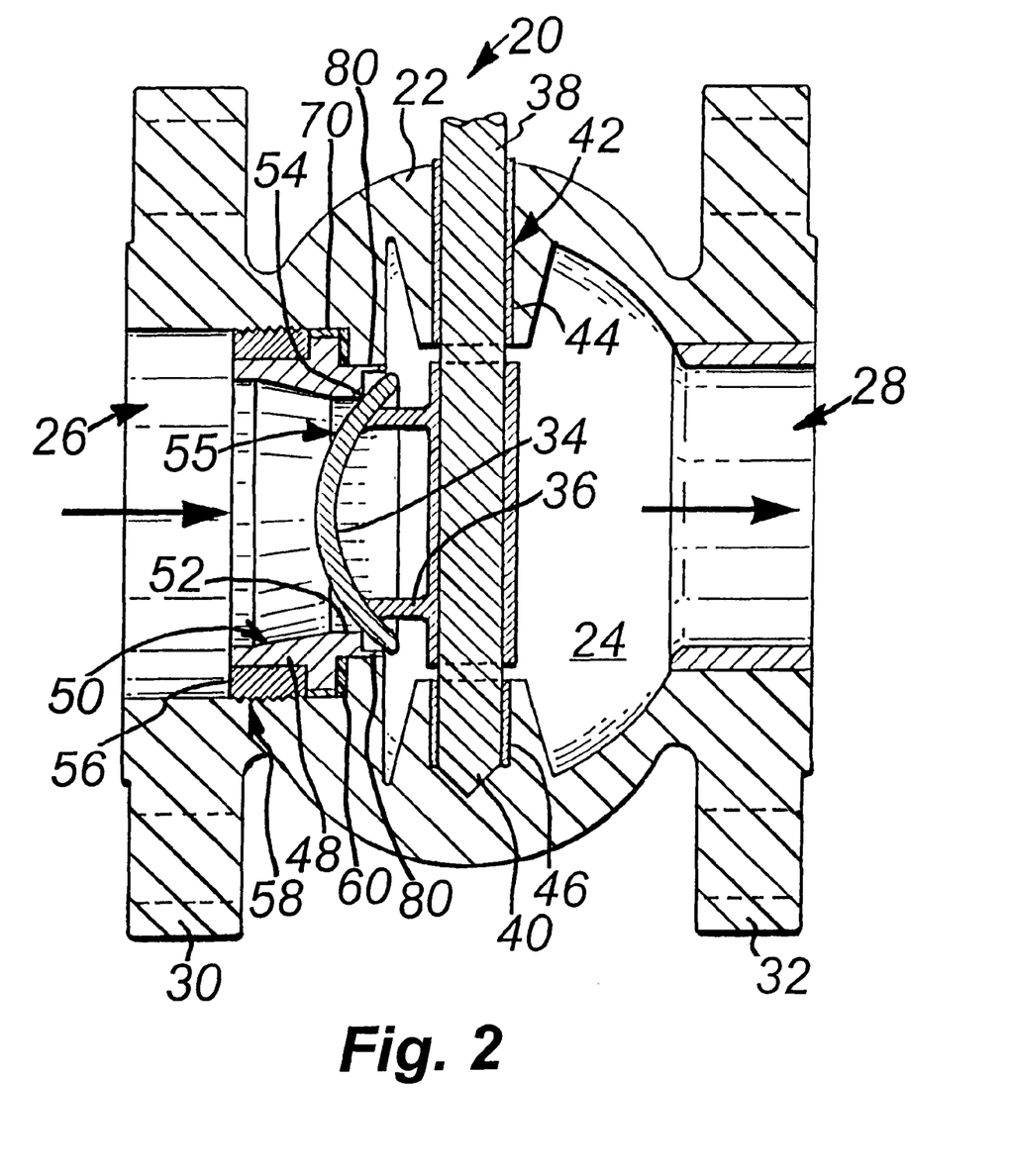
FIG. 2 is a top cross section of the rotary valve of FIG. 1.
Figure 3:
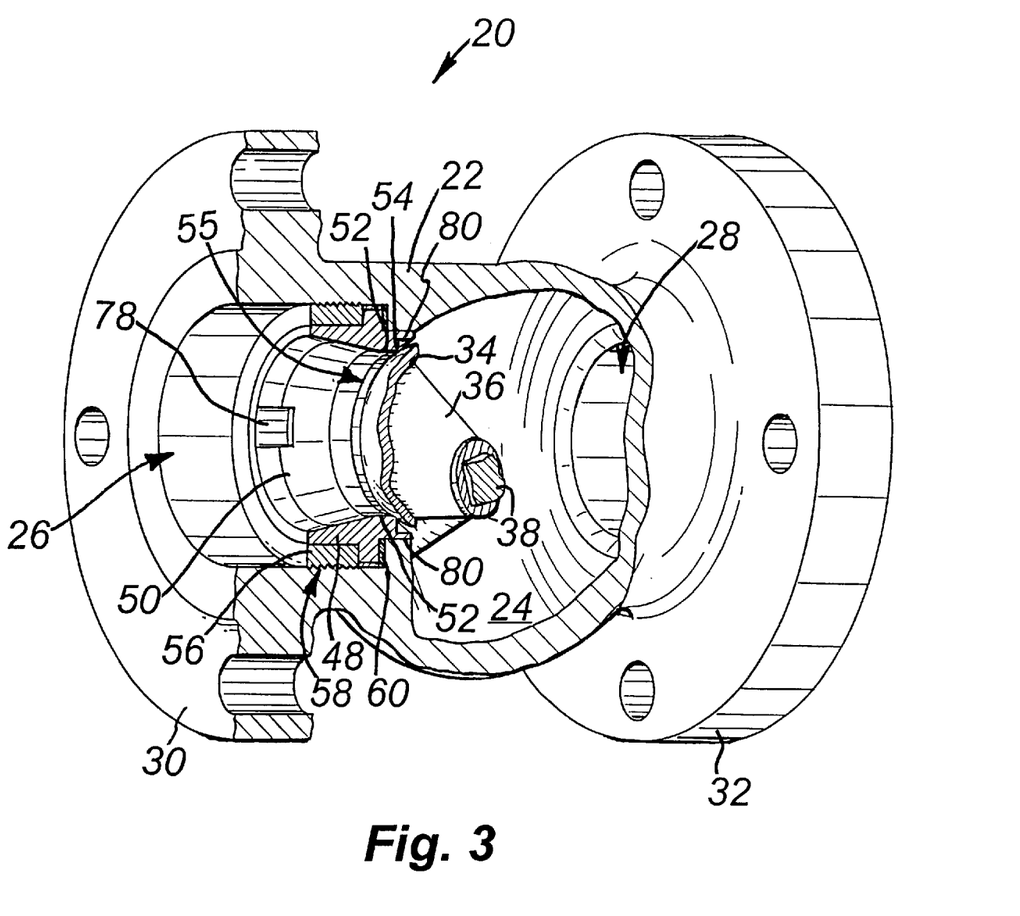
FIG. 3 is a partially exposed perspective view of the rotary valve of FIG. 1.
Figure 4:
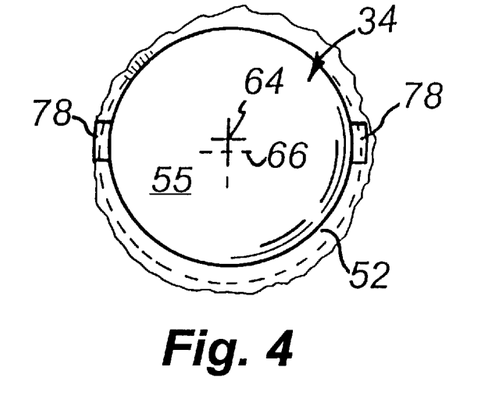
FIG. 4 is a partial front view of the seat ring and plug for the rotary valve of FIG. 1.

A rotary valve 20 according to one embodiment of this invention is illustrated generally in FIGS. 1, 2 and 3. The valve 20 is constructed with a metal outer housing or casing 22 having an open central chamber 24, an inlet 26 and an outlet 28. The specific diameter of the inlet 26 and outlet 28 can be varied based upon the amount of fluid to be transported through the valve. The inlet 26 and outlet 28 are connected with associated piping or conduits by respective flanges 30 and 32 in this embodiment. It is contemplated, however, that a variety of inlet and outlet connections can be provided according to this invention.

Flow of fluid from inlet 26 into the chamfer 24 and, thence, into the outlet 28 is controlled by a rotating plug 34. The plug 34 in this embodiment is shaped generally as a hemisphere. The plug 34 is mounted on a bracket assembly 36 that is, itself, mounted on a shaft 38. The shaft, 38 in this embodiment includes a square cross section. A variety of cross sectional shapes are contemplated, however. Such cross sectional shapes can include round, partially round, hexagonal, splined, triangular or another irregular shape.

The shaft 38 is fixed at its free end 40 (FIG. 2) within a preformed orifice in the casing 22. The shaft enters the casing through another through-cut channel 42. Journals 44 and 46 can be provided to seal the shaft and reduce friction as the shaft 38 rotates.

The bracket 36 can be mounted so that is slides laterally along the elongated axis of the shaft 38. In this manner, the hemispherical plug 34 can be located laterally accurately relative to the inlet 26. Such lateral movement is discussed further below.

In a proper orientation, the plug 34 forms a fluid-tight seal against the seat ring 48 of this invention. The seat ring 48 can be formed from a variety of materials. Stainless steel is preferred according to this embodiment. The seat ring 48 includes an inlet inner wall 50 that defines an inwardly tapered frustoconical shape terminating adjacent the plug 34 at an annular seating shoulder 52. The seating shoulder 52 includes a corner 54 that engages the hemispherical seating surface 55 of the plug 34. The corner 54 can include a slight chamfer (see chamfer 55 in FIG. 5) to provide a larger seating area between the plug 34 and shoulder 52.

The seat ring 48 is retained by a retaining ring 56 that engages threads 58 formed within the inlet 26 of the casing 22. By tightening the retaining ring 56, the seat ring 48 is brought into firm engagement with a gasket 60 formed from conventional gasket materials. Interengagement between the casing 22 gasket 60 and seat ring 48 ensures that fluid can only pass between the plug 34 and inner shoulder 52.

Figure 5:
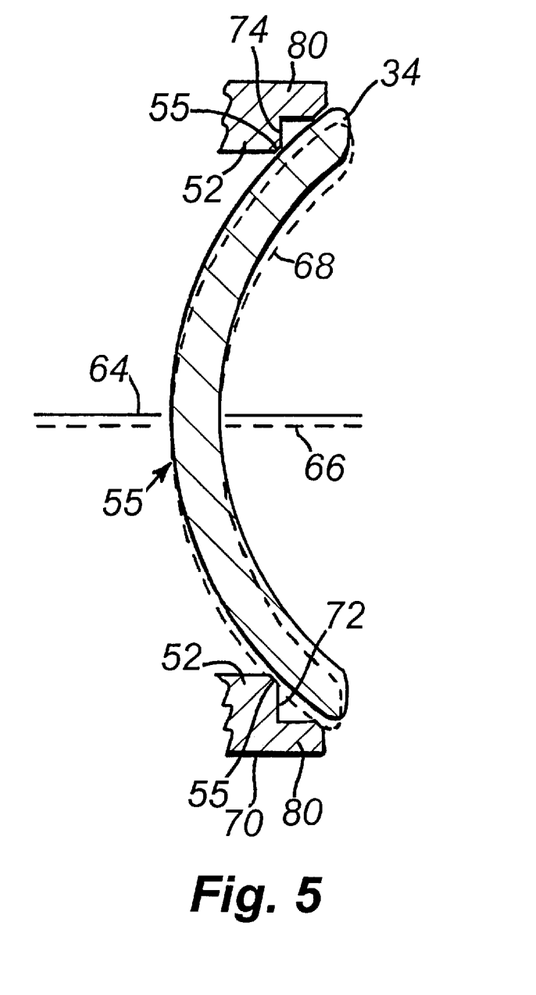
FIG. 5 is a partial side cross section of the seat ring and plug illustrating an offset seating arrangement.
Figure 6:
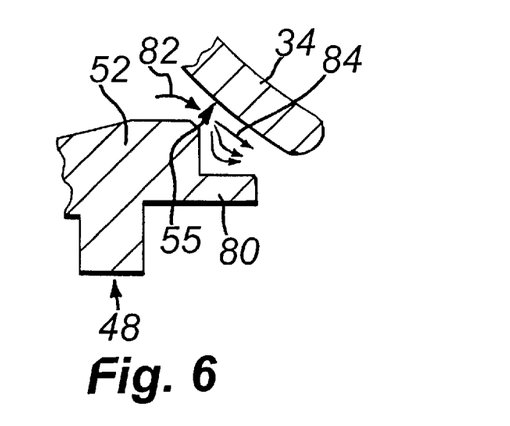
FIG. 6 is a partial side cross section of the seat ring and plug in a partially open position showing the breakup of the fluid jet.

It is thus desirable to maintain as close a tolerance fit between the plug 34 and shoulder 52 as possible. With further reference to FIGS. 5 and 6, it is known that the formation of plugs using modem mass-production techniques can sometimes result in hemispherical plug surfaces 34 having a center 64 that is misaligned relative to the center 66 (shown in phantom) of the body bore of the inlet 26. In other words, the plug's hemispherical surface is slightly out-of-line (eccentric) with its desired position relative to the shaft 38. This misalignment can result from plug formation errors or inherent molding inaccuracies. A seat ring aligned with the inlet body bore center 66 seats most tightly against a similarly aligned plug surface 68 (as shown in phantom in FIG. 5). The seat ring 48 according to this invention therefore is formed with a seating shoulder 52 that can be aligned eccentrically relative to the inlet center. The inner seating bore defined by the seating shoulder 52 has a center that is offset relative to the center of the bore defined by the housing 22. The seating ring 48 is rotatably engaged within the housing bore. In side profile, as shown in FIGS. 1, 3 and 5, the distance between the top of the bore in seating shoulder 52 and outer diameter 70 is greater than the opposite wall distance between the bore in seating shoulder 52 and outer diameter 70 for the given seat ring orientation shown and described. The difference between the upper wall thickness and lower wall thickness equals twice the maximum eccentricity of the seating shoulder 52 versus the outer wall for the seat ring 48. In one embodiment, the degree of eccentricity can be approximately 0.05 to 0.2 inch. The degree of eccentricity can be varied depending upon the expected tolerance variation between plugs in a given type of valve and depending upon the valve's overall bore size.

Formation of an eccentric seat ring 48 according to this embodiment can be accomplished by first forming a solid disk stock piece without an inner hole and boring an inner hole, complete with the seating shoulder 52 at a location that is off-center from a center defined by the outer perimeter of the stock piece. Other methods in which all forming operations are undertaken simultaneously are also contemplated.

The inlet wall 50 of the ring 48 includes slots 78. The slots can be engaged by an adjusting tool and enable a user to rotate the ring as it is seated within the inlet 26. The retaining ring 56 is typically loosened during rotation. By rotating the ring, the size of the upper wall portion 74 and lower wall portion 72 can be varied between minimum and maximum offset amounts. Clearly, any position other than one in which the maximum and minimum offsets are aligned along a vertical axis (perpendicular to the axis of the shaft 38 as shown) results in a lateral offset as well. However, as noted above, the plug can be easily adjusted side-to-side by sliding the plug bracket 36 along the shaft 38. Thus, an infinite number of a vertical offset position can be provided between minimum and maximum offset values while any associated lateral offset is completely accommodated by side-to-side movement of the plug bracket along the shaft 38.

In practice, adjustment of the seat ring 48 according to this embodiment entails the placement of the seat ring 48 into the inlet 26, followed by a visual inspection of the relationship between the plug and the seat ring. The seat ring 48 is then rotated until the seating shoulder 52 is centered relative to the center 64 of the plug's hemispherical seating surface 55 without gaps. The retaining ring 56 is then threaded into position and locked down by tightening to secure the seat ring in its desired rotational orientation within the inlet.

As noted above, the seat ring 48 is shown and described in FIGS. 1–5 with a maximum vertical offset. The side walls of the shoulder 52 in top view (FIG. 2) will be approximately equal in length in this embodiment. These walls are, of course, unequal when the seat ring is placed in a rotational orientation other than that shown.

Additionally, by varying the thickness of the gasket 60 the distance of the seating shoulder 52 toward and away from the plug can be varied, thus accommodating any variation in the spacing of the plug's hemispherical seating surface 55 from the inlet.

With further reference to FIG. 6, a larger diameter step 80 is located inwardly of the seating shoulder 52. The step 80 can also be formed eccentrically with a center that is aligned with the center of the shoulder 52. Alternatively, the step 80 can be formed with a center that is aligned with the inlet body bore center. In both examples, the step has a diameter that is larger at all rotational points than the diameter of the shoulder 52. In this embodiment, the shoulder can be 0.1–1.0 inch larger in diameter than the inner seating shoulder 52. This diametrical difference, of course, can vary based upon the size of the valve and its normal operating pressure range. The step 80, as detailed in FIG. 6, aids in breaking up flow of a fluid jet (arrows 82 and 84) as it passes between the plug 34 and the seat ring 48 with the plug at a minimally open position (5° to 15°, for example). By generating turbulence adjacent the gap between the seat ring 48 and plug 34, the step controls noise (for example a distinct whistling sound) generated by high pressure fluid as it passes through the partially open valve plug. It is contemplated that the step 80 shown and described herein can be used in conjunction with any seat ring including those that lack an eccentric seating shoulder.

FIGS. 7–10 illustrate an alternate embodiment of a rotary valve according to this invention in which noise is further controlled by providing an improved plug and outlet geometry. The valve casing 100 of this embodiment is adapted to receive the eccentric seat ring 48 with low noise step according to the preceding embodiment as illustrated in FIGS. 1–6. However, a more-conventional seat ring can be provided to the casing 100. Likewise, while a square cross section shaft 102 is used to actuate the plug assembly 104 according to this embodiment, a shaft of any acceptable cross sectional shape can be substituted.

The plug assembly 104 includes a hemispherical plug seating surface 106 that, in this embodiment, is sized and arranged relative to the seat ring 48 similarly to the plug 34 of the preceding embodiment. The plug 106 is supported by a bracket assembly 108 that is mounted to a sleeve 10 disposed upon the shaft 102. A second bracket assembly 112 extends oppositely from the plug bracket assembly 108. Located on the rear bracket assembly 112 is a secondary outlet plug 114 according to this embodiment. The outlet plug 114 also defines a hemispherical shape. The bracket 112 and plug 114 are arranged so that the hemisphere's center 116 (FIG. 7) is aligned radially relative to the center axis 118 of the shaft 102. Hence, unlike the sealing plug 106 which is offset from the shaft 102 so that it draws away from the seat ring 48 as the shaft rotates, the outlet plug 114 rotates along a circular path as shown in phantom in FIG. 7. This circular path is centered about the shaft's center axis 118. The outlet plug 114 is sized and arranged to cover the outlet section 120 of the valve casing 100. A gap 122 is maintained between the surface of the outlet plug 114 and the outlet structure 120 as this plug is not intended to tightly seal the outlet. The gap can be varied based upon the size of the valve and the flow characteristics. In this embodiment, a gap of approximately 0.5–0.1 inch is provided.

Figure 7:
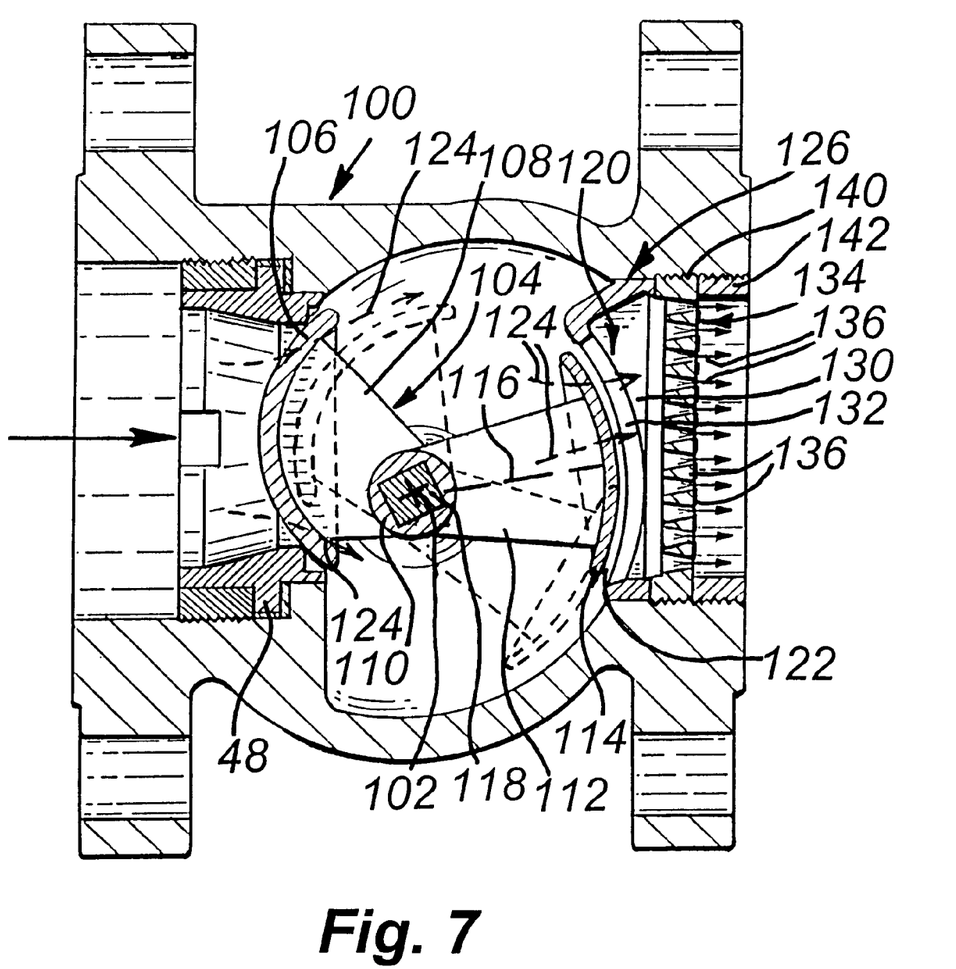
FIG. 7 is a side cross section of an other embodiment of a rotary valve according to this invention including a low noise outlet structure.
Figure 8:
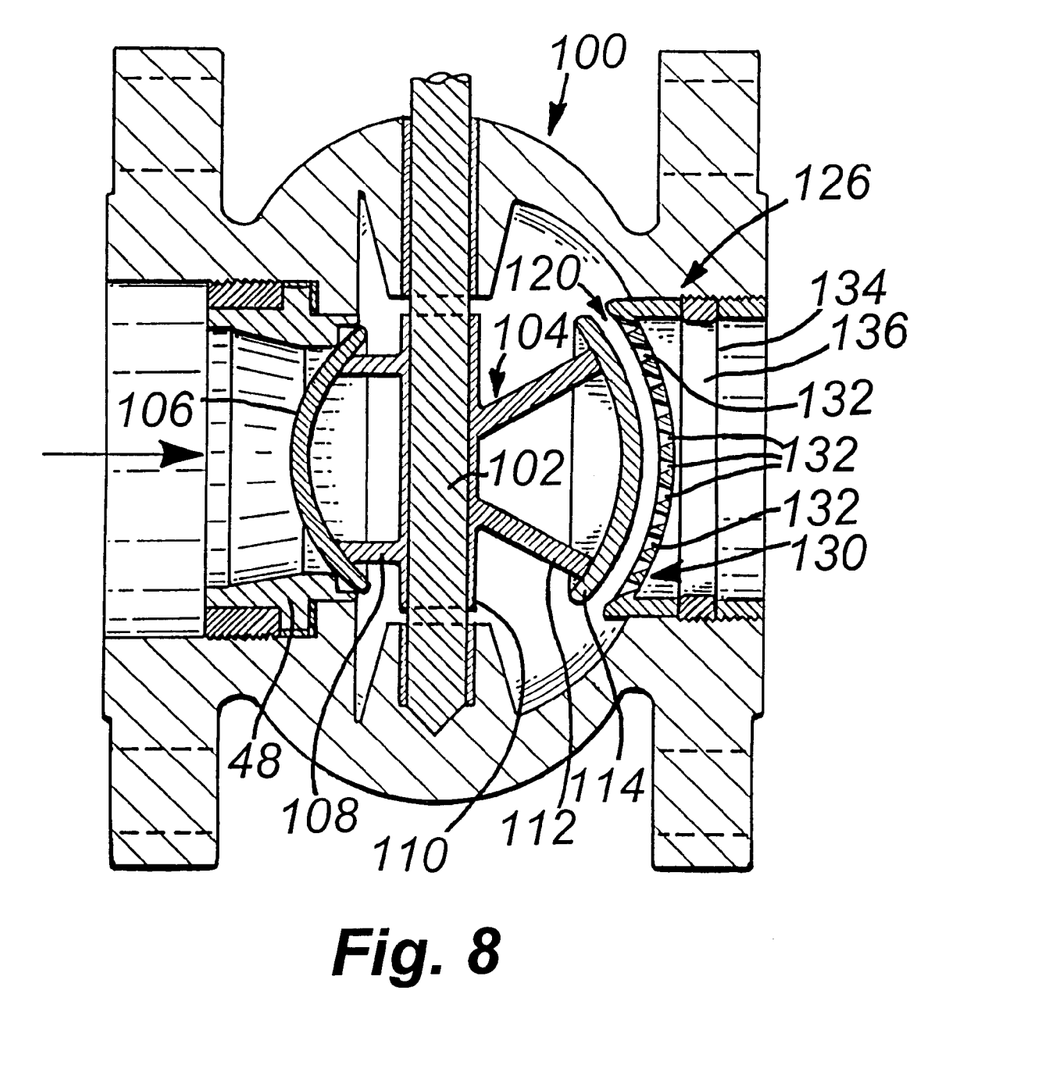
FIG. 8 is a top cross section of the rotary valve of FIG. 7.
Figure 9:
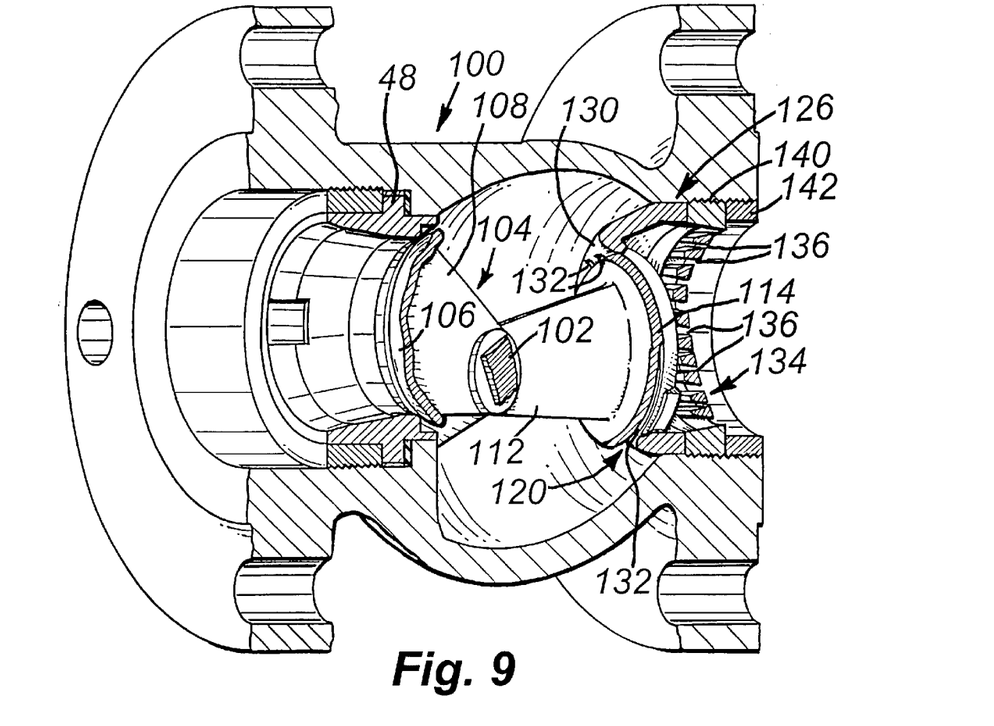
FIG. 9 is a partial exposed perspective view of the rotary valve of FIG. 7.

As further detailed in FIG. 7, when the plug assembly 104 is rotated to a partially open position (shown in phantom) fluid flows through the seat ring past the plug 106 (see arrows 124). The partially opened plug still provides resistance to flow of fluid through the inlet. In a normal valve, the outlet remains fully open and thus, substantially less resistance is presented at the outlet. This difference in flow characteristics between the inlet and outlet can lead to noise and unpredictable behavior fluid. However, by providing the secondary plug 114 that partially covers the outlet section 120 when the sealing plug 106 is only partially open, a more even flow characteristic is obtained. In other words, the surface are presented to fluid at the inlet roughly corresponds to the surface area presented to the fluid at the outlet. It should be clear that the exact size and configuration of the secondary plug 114 can be varied to accommodate different outlet size and shapes. In addition, the plug can be constructed so that it is smaller than the outlet opening or, conversely, larger than the outlet opening where desired.

A further feature of the valve casing 100 according to this embodiment is a low noise structure 126 at the outlet. The noise-reducing structure 126 of this embodiment includes a front (upstream) slotted structure 130 having a series of vertical slots 132 (see FIG. 8) that, in this embodiment, each taper from a widened inlet to a more narrow outlet. The angle of taper is typically between 10° and 20° in this embodiment. It is contemplated that a variety of sizes and configurations of tapered slots can be utilized according to this invention. Also, an insert can be constructed that has holes instead of slots. A second rear (downstream) slotted structure 134 having an additional series of tapered slots 136, that are similar in configuration to the slots 132 of the first structure 130, are also provided. The second slotted structure 134 is located downstream in the flow and its slots 136 are oriented perpendicularly to the vertical slots 132. In other words, the second set of slots 136 are aligned approximately parallel with the axis of the shaft 102. In this embodiment, the front slotted structure 130 defines the outlet structure 120 that is adjacent the secondary plug 114. Accordingly, it is formed as a curved and/or hemispherical wall section with the slots cut into the curved shape of the wall. The curve is meant to provide a constant gap relative to the secondary plug 114. This ensures that a restricted flow is maintained when the valve is partially open. The rear slotted structure 134 is formed as a removable insert that engages threads 140 within the outlet body bore. A further retaining ring 142 with threads can also be provided to prevent rotation of the rear slotted structure 134. The orientation of the slots in the front and rear slotted structures 130 and 134 can be rearranged. In other words, the front slots can be made horizontal while the rear slots can be made vertical. In this embodiment, it is generally desired that the slots be perpendicular to each other to further break up the flow. Likewise, both the front and rear sets of slots 132, 136 can be oriented at a non-perpendicular angle relative to the axis of the shaft 102. It is contemplated that the front slotted structure 130 can be provided as a removable member according to an alternate embodiment. Additionally, it is contemplated that the secondary plug can be omitted in an alternate embodiment and, in such cases, the front slotted structure can be made flat or another desirable shape.

The slotted structures serve to further disrupt the flow of fluid as it exits the valve casing. It is known that a flow entering a small opening will develop a low static pressure causing vaporization of fluid. This vaporization leads to trapped gas bubbles that subsequently collapse at a downstream location as pressures again rise. Such a collapse is typically known as cavitation and can produce loud noises or even damage to pipes and other components. The liquid is accelerated from the larger cross section to the smaller cross section where the fluid vaporizes due to lower static pressure. The vapor is then forced to collapse adjacent to the tapered outlet of each of the slots due to higher downstream pressure. This collapse occurs before gas bubbles can aggregate into large, damaging voids further downstream. By crossing the slots, the flow is further disrupted and the entire outlet bore cross section is acted upon. This serves to further reduce noise and ensure more-complete collapse of bubbles. Hence, the tapered slotted structures 130 and 134 reduce noise directly adjacent the outlet, before more significant noise problems can develop downstream.

Note that the slots shown and described herein can be substituted for other structures in which the cross section of the flow varies with respect to the flow path. Two discrete slot sets are used herein, more flow restricting structures can be provided along the path according to an alternate embodiment. Likewise, the two, or more, sets can be combined into a single integral unit.

Reference is made to the paper entitled Coefficients and Factors Relating to Aerodynamic Sound Level Generated by Throttling Valves, by Hans D. Baumann in the 1984 January-February Noise Control Engineering Journal. The contents of this paper are expressly incorporated herein by reference. According to this paper, it is recognized that the acoustical efficiency (in other words, noise-generating ability) will vary as a function of the degree of pressure recovery ($F_L$ factor) over a range of pressure ratios (for inlet and outlet values). Streamline passages have low $F_L$ factors and an abrupt discharge area has a high $F_L$ factor that can be close to 1.0. By providing a small cross section at the inlet and a tapered flow path toward the outlet, such as shown and described in this invention, a low $F_L$ is provided. Such a low $F_L$ is advantageous for high pressure ratios between the inlet and the outlet that are above 2:1 since this generates a lower acoustical efficiency, typically 5–10 dB over that of a high $F_L$ passage. However, when the pressure drop is low (below 2:1), a high $F_L$ is preferred for lower acoustical efficiency, typically 5–10 dB lower. In this case, the small cross section is located downstream. Hence, a range of slot sizes and configurations can be employed to custom-fit the low noise outlet section to the given pressure conditions of the valve in its normal operating range.

Figure 10:
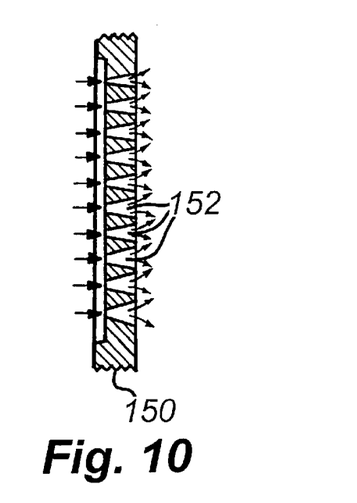
FIG. 10 is an alternate embodiment of a low noise insert for use with a rotary valve of FIG. 7.

FIG. 10 shows an example of a low noise insert 150 having slots 152 that diverge, becoming wider in the downstream direction. The insert 150 is particularly useful where a highly compressible fluid experiences a fairly high drop in pressure (pressure ratio above 2:1). The insert 150 may be threaded and can be used without the retaining 142 shown in FIGS. 8 and 9. Furthermore, the insert 150 may be reversed with respect to the flow path, depending on the application. As noted above, a variety of low noise structures having varied geometry can be employed according to this invention. It is desirable primarily that a surface area be placed in contact with the fluid and that the cross section of fluid flow change (either increasing or decreasing) along the flow path through the outlet.

The foregoing has been a detailed description of preferred embodiments of this invention. Various modifications and additions can be made without departing from the spirit and scope of this invention. For example, a hemispherical plug is shown, but other shapes and sizes of plugs, such as cylinders, ovoids, or flat plates can be substituted where appropriate. The low noise inserts shown utilize slots, but discrete holes with tapered walls or other geometric arrangements in which the flow section changes in the direction of flow path can be substituted. Likewise, each of the components described herein can be constructed as a fixed portion of the valve casing or can be made adjustable and removable.

Accordingly, this description is meant to be taken only by way of example and not to otherwise limit the scope of the invention.

It is claimed:

1. A rotary valve comprising:
    a casing having an inlet and an outlet;
    a plug movably located relative to the inlet; and
    a seat ring located in the inlet adjacent the movable plug, the seat ring including an outer diameter that engages the casing and an inner seating shoulder constructed and arranged to engage the plug, the inner seating shoulder having a center and the outer diameter having a center, the center of the inner seating shoulder being offset from the center of the outer diameter and the seat ring being constructed and arranged to be rotatable relative to the inlet.

2. The rotary valve as set forth in claim 1 wherein the plug includes a hemispherical seating surface.

3. The rotary valve as set forth in claim 1 wherein the inlet includes a body bore having a shoulder for receiving a gasket and further including a gasket located between the seat ring and the shoulder for receiving the gasket.

4. The rotary valve as set forth in claim 3 further comprising a retaining ring threadingly coupled to the inlet and biasing the seat ring into engagement with the gasket.

5. The rotary valve as set forth in claim 4 wherein the seat ring includes adjusting structures constructed and arranged to enable the seat ring to be engaged so that it can be rotated relative to the inlet.

6. The rotary valve as set forth in claim 5 wherein the adjustment structures comprise slots formed in a portion on the seat ring on a side of the seat ring opposite a side adjacent the plug.

7. The rotary valve as set forth in claim 1 wherein the seat ring includes a secondary shoulder located between the inner seating shoulder and the plug, the secondary shoulder having a diameter larger than a diameter of the inner seating shoulder, the secondary shoulder being constructed and arranged to disrupt flow of a jet of fluid moving between the inner seating shoulder and the plug when the plug is located in a partially open position.

8. The rotary valve as set forth in claim 1 wherein a portion of the outlet is threaded to receive a slotted plate for noise abatement.

9. The rotary valve as set forth in claim 8 wherein said slotted plate has openings comprising parallel slots having tapered sidewalls.

* * * * *